United States Patent
Motzer et al.

(10) Patent No.: US 9,149,929 B2
(45) Date of Patent: Oct. 6, 2015

(54) METHODS AND SYSTEMS FOR INSPECTION SENSOR PLACEMENT

(75) Inventors: William P. Motzer, Seattle, WA (US); Gary E. Georgeson, Federal Way, WA (US); Scott W. Lea, Renton, WA (US); Peter J. Hellenbrand, Seattle, WA (US); James J. Troy, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 271 days.

(21) Appl. No.: 12/787,885

(22) Filed: May 26, 2010

(65) Prior Publication Data
US 2011/0295427 A1    Dec. 1, 2011

(51) Int. Cl.
B25J 9/16    (2006.01)
B25J 9/06    (2006.01)

(52) U.S. Cl.
CPC ... *B25J 9/162* (2013.01); *B25J 9/06* (2013.01); *B25J 9/065* (2013.01); *B25J 9/1694* (2013.01); *G05B 2219/39014* (2013.01); *G05B 2219/39024* (2013.01); *G05B 2219/40039* (2013.01); *G05B 2219/40234* (2013.01); *G05B 2219/45071* (2013.01)

(58) Field of Classification Search
CPC .... A61B 2019/2211; B25J 9/06; B25J 9/065; B25J 13/086; G05B 2219/39024; G05B 2019/45083; G05D 1/0238; G05D 1/0246; G05D 1/0274
USPC ......... 701/3; 703/8; 73/865.8, 865.9; 702/36, 702/94, 95, 104; 901/47, 4, 5, 10, 3; 700/258, 217, 245, 254, 114, 192, 50, 700/248; 600/424, 427, 114, 142, 146; 128/899; 324/226, 207.12; 356/614, 356/251; 378/58, 51; 348/25, 207.1, 348/207.11, 208.3; 250/561, 559.29, 250/559.33; 180/9.1; 318/568.12, 568.16; 446/278

See application file for complete search history.

(56) References Cited

U.S. PATENT DOCUMENTS

| | | | | |
|---|---|---|---|---|
| 4,362,977 A | * | 12/1982 | Evans et al. | 901/3 |
| 5,374,830 A | * | 12/1994 | Pryor | 250/559.3 |
| 5,525,883 A | * | 6/1996 | Avitzour | 701/23 |
| 6,378,387 B1 | * | 4/2002 | Froom | 73/865.8 |
| 6,822,412 B1 | * | 11/2004 | Gan et al. | 901/3 |
| 6,907,799 B2 | * | 6/2005 | Jacobsen et al. | 73/865.8 |

(Continued)

FOREIGN PATENT DOCUMENTS

| | | |
|---|---|---|
| EP | 2216144 A2 | 8/2010 |
| JP | 2000070269 | 3/2000 |

OTHER PUBLICATIONS

U.S. Appl. No. 12/640,211, filed Dec. 17, 2009.

(Continued)

*Primary Examiner* — Tuan C. To
*Assistant Examiner* — Dale W Hilgendorf
(74) *Attorney, Agent, or Firm* — Armstrong Teasdale LLP

(57) ABSTRACT

Methods and systems are provided for positioning a remote sensor within a target object. An articulated robotic system is coupled to the remote sensor. A positioning system determines a position of the target object to be inspected and determines a first position of the remote sensor. A control system calibrates a virtual representation of the target object with respect to the position of the target object, and tracks movement of the remote sensor relative to the target object.

20 Claims, 4 Drawing Sheets

(56) References Cited

U.S. PATENT DOCUMENTS

| | | | |
|---|---|---|---|
| 6,968,224 B2 * | 11/2005 | Kessman et al. | 600/407 |
| 7,099,745 B2 * | 8/2006 | Ebert | 700/245 |
| 7,117,067 B2 * | 10/2006 | McLurkin et al. | 901/10 |
| 7,171,279 B2 * | 1/2007 | Buckingham et al. | 700/50 |
| 7,387,179 B2 * | 6/2008 | Anhalt et al. | 180/9.1 |
| 7,499,772 B2 * | 3/2009 | Wilcox et al. | 701/3 |
| 2003/0089183 A1 * | 5/2003 | Jacobsen et al. | 73/865.8 |
| 2004/0013295 A1 * | 1/2004 | Sabe et al. | 382/153 |
| 2005/0203382 A1 * | 9/2005 | Govari et al. | 600/424 |
| 2007/0113690 A1 | 5/2007 | Wilcox et al. | |
| 2008/0004523 A1 * | 1/2008 | Jensen | 600/424 |
| 2008/0097156 A1 * | 4/2008 | Nakamura | 600/424 |
| 2008/0195343 A1 * | 8/2008 | Osterlund et al. | 702/95 |
| 2008/0302200 A1 * | 12/2008 | Tobey | 74/490.02 |
| 2009/0069937 A1 | 3/2009 | Battenburg | |
| 2009/0086014 A1 | 4/2009 | Lea et al. | |
| 2009/0086199 A1 | 4/2009 | Troy et al. | |
| 2009/0137952 A1 * | 5/2009 | Ramamurthy et al. | 600/424 |
| 2009/0171151 A1 * | 7/2009 | Choset et al. | 600/114 |
| 2010/0010504 A1 * | 1/2010 | Simaan et al. | 606/130 |
| 2010/0102980 A1 | 4/2010 | Troy et al. | |
| 2010/0153051 A1 | 6/2010 | Georgeson et al. | |
| 2010/0188510 A1 * | 7/2010 | Yoo et al. | 348/164 |
| 2010/0228506 A1 | 9/2010 | Motzer et al. | |
| 2010/0235037 A1 * | 9/2010 | Vian et al. | 701/29 |

OTHER PUBLICATIONS

International Search Report and Written Opinion of PCT/US2011/029717; Jun. 16, 2011; 14 pages.

Buckingham, R. et al.; Snake-Arm Robots: A New Approach to Aircraft Assembly; SAE Aerotech Congress, Los Angeles, CA; Sep. 17, 2007; pp. 1-6.

Notice of Reasons for Rejection from the Japanese Patent Office for application No. 2013-512617, Apr. 7, 2015, 4 pages.

* cited by examiner

METHODS AND SYSTEMS FOR INSPECTION
SENSOR PLACEMENT

BACKGROUND

The subject matter described herein relates generally to inspections and more particularly to methods and systems for placement of inspection sensors.

Known aircraft generally undergo routine inspection of various components. Numerous aircraft components typically are inspected, and the equipment used to perform such inspections can vary from component to component depending, for example, on the component type and/or location. Inspecting at least some components may be difficult because of various spatial restrictions. For example, access to at least some components may require disassembly of at least one occluding structure and/or removal of the component prior to inspection. Inspecting such components may be a tedious and time-consuming task.

To facilitate inspection of at least some of such components, articulated robot manipulator arms have been used to position inspection sensors within at least some limited access areas. Such articulated robot manipulator arms facilitate avoiding disassembly of portions of the aircraft in connection with performing inspections. Due to joint and link flexibility and high-degrees of freedom of such robot manipulator arms, accurate, real-time positioning and orientation tracking of such robot manipulator arms can be difficult. Further, positioning errors may build up the further down a chain of articulated segments a location is from a base. As such, the position of the end effector, i.e., the location of an inspection sensor, generally has the largest errors.

BRIEF DESCRIPTION

In one aspect, a method is provided for positioning a remote sensor within a target object. The method includes determining a position of the target object using a first sensor, and calibrating a virtual representation of the target object with respect to the position of the target object. A first position of the remote sensor is determined, and movement of the remote sensor is tracked relative to the target object.

In another aspect, a control system is provided for positioning a remote sensor within a target object. The control system is configured to determine a position of the target object using a first sensor, and calibrate a virtual representation of the target object with respect to the position of the target object. The control system is further configured to determine a first position of the remote sensor, and track movement of the remote sensor relative to the target object.

In yet another aspect, a system is provided for positioning a remote sensor within a target object. The system includes an articulated robotic system coupled to the remote sensor, a positioning system that determines a position of the target object and determines a first position of the remote sensor, and a control system that calibrates a virtual representation of the target object with respect to the position of the target object and tracks movement of the remote sensor relative to the target object.

The features, functions, and advantages that have been discussed can be achieved independently in various embodiments of the present invention or may be combined in yet other embodiments further details of which can be seen with reference to the following description and drawings.

DETAILED DESCRIPTION

The subject matter described herein relates generally to the inspection of a target object. More particularly, the subject matter described herein relates to methods and systems that facilitate remotely positioning a sensor within a target object being inspected. In one embodiment, a sensor is remotely positioned within a target object, and a positioning system determines a position of the target object and determines a first position of the sensor. A control system calibrates a virtual representation of the target object with respect to the position of the target object and tracks movement of the sensor relative to the target object.

An exemplary technical effect of the methods and systems described herein includes at least one of: (a) determining a position of the target object using a first sensor; (b) calibrating a virtual representation of the target object with respect to the position of the target object; (c) determining a first position of the remote sensor; (d) determining a second position of the remote sensor relative to the first position of the remote sensor; and (e) tracking movement of the remote sensor relative to the target object based on at least the first position and the second position of the remote sensor.

As used herein, an element or step recited in the singular and proceeded with the word "a" or "an" should be understood as not excluding plural elements or steps unless such exclusion is explicitly recited. Furthermore, references to "one embodiment" of the present invention are not intended to be interpreted as excluding the existence of additional embodiments that also incorporate the recited features.

Figure 1:
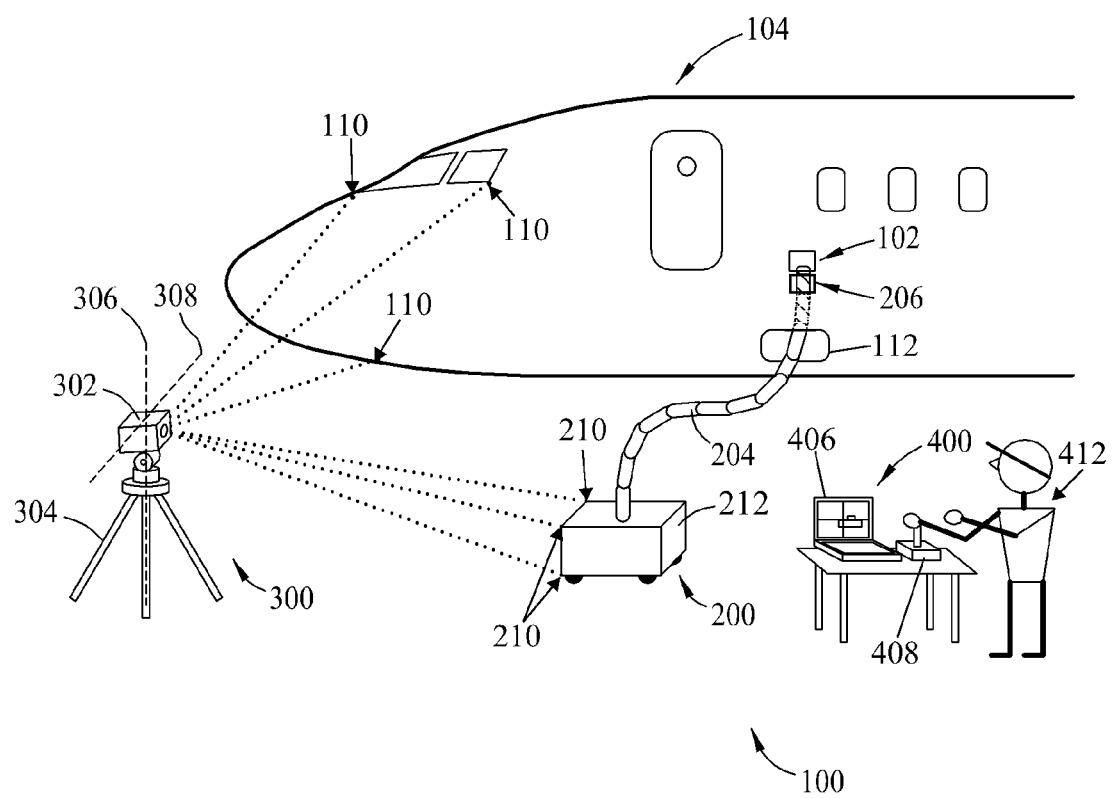
FIG. 1 is an illustration of an exemplary system that may be used to place and/or visualize a sensor within a target object being inspected.
Figure 2:
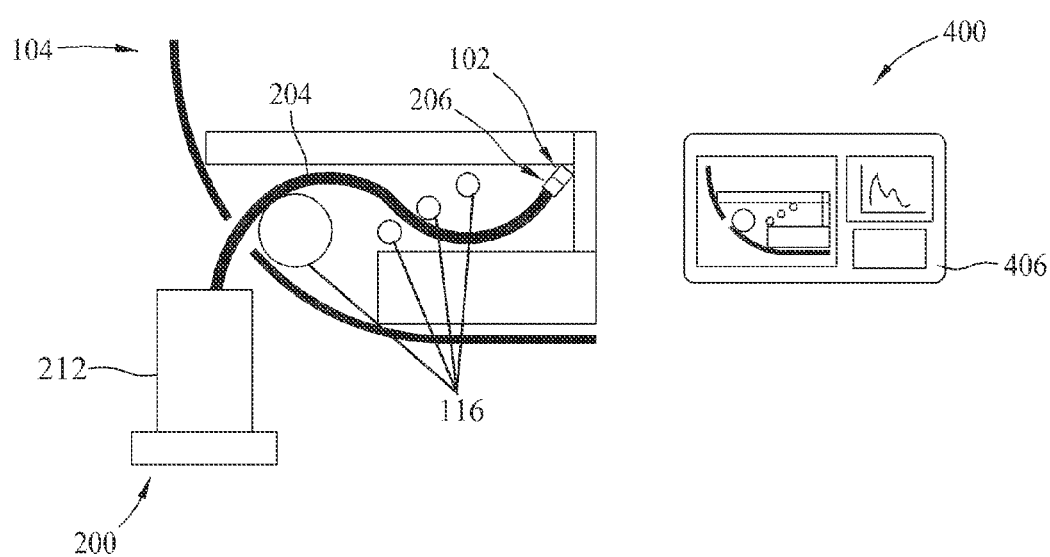
FIG. 2 is an enlarged schematic illustration of a portion of the system shown in FIG. 1.

FIGS. 1 and 2 illustrate an exemplary system 100 that may be used to place and/or visualize an inspection sensor 102 within a target object or structure 104 being inspected. Notably, any type of inspection sensor, such as a non-destructive inspection (NDI) sensor, that enables system 100 to function as described herein may be used. In the exemplary embodiment, inspection sensor 102 detects at least one parameter of structure 104. As such, inspection sensor 102 may be used to inspect a surface of structure 104 and/or scan data for system 100. Inspection sensor 102 may be, without limitation, an optical sensor, a camera, an infrared sensor, an ultrasonic sensor, an eddy current sensor, a vibration sensor, a magnetometer, a laser scanner, a temperature probe, a microphone, a speaker, a capacitance-based gap measurement meter, an electrical multimeter, a voltage meter, a resistance meter, a current meter, a conductivity meter, a static charge meter, and/or any combination of the aforementioned components.

In the exemplary embodiment, an articulated robotic system 200, such as a robotic snake system, is coupled to inspection sensor 102 to position, move, and/or orient inspection sensor 102 relative to structure 104. In the exemplary embodiment, articulated robotic system 200 is a pedestal-mounted robotic snake system, also referred to as an elephant trunk robot, includes a mobile base 212 and an articulated arm 204 extending from mobile base 212. Alternatively, articulated robotic system 200 may be, but is not limited to being, a crawling robotic snake system, an endoscope, and/or a bore scope that does not include a base 212. In a further embodiment, any articulated robotic system that enables system 100 to function as described herein may be used.

In the exemplary embodiment, arm 204 includes a plurality of jointed segments (not numbered) that enable articulated robotic system 200 to be selectively positioned with multiple degrees of freedom. As such, articulated robotic system 200 is configured to selectively move and/or orient inspection sensor 102 in various positions suitable for inspecting and/or evaluating structure 104. In one embodiment, motion instructions transmitted to the jointed segments in arm 204 to move and/or orient inspection sensor 102 in a desired direction. The motion instructions are variably selected with a desired speed and direction that will result in a desired movement of inspection sensor 102 located at the end effector of arm 204. More specifically, in such an embodiment, arm 204 is navigable in a three-dimensional space by variably transmitting motion instructions simultaneously to each jointed segment in order to produce bending, twisting, spiraling, and/or turning motions.

In the exemplary embodiment, articulated robotic system 200 includes at least one sensor system capable of determining its current position and location, such as positioning sensor 206, that is a self-contained unit capable of tracking and/or monitoring movement of at least one location on arm 204 and/or inspection sensor 102, including transient oscillations of arm 204 and/or inspection sensor 102. Positioning sensor 206 provides a positional awareness for system 100 and may be capable of measuring both a position and an orientation of its location on the articulated robotic system 200 relative to structure 104. In the exemplary embodiment, positioning sensor 206 is an inertial sensor, such as a microelectromechanical system (MEMS). Positioning sensor 206 is part of a measurement system, which may include a processor (not shown), a plurality of accelerometers (not shown) that measure linear acceleration, a plurality of gyroscopes (not shown) that measure rotational velocity, and software (not shown) to process the linear acceleration and/or rotational velocity data to produce relative position and orientation information. Other types of self-contained positioning sensors 206 are also possible, such as those that use cameras to process image data to determine the location of positioning sensor 206 within structure 104.

In the exemplary embodiment, a local coordinate measurement system 300 provides positional awareness data to facilitate determining a first position of inspection sensor 102 relative to structure 104. In the exemplary embodiment, local coordinate measurement system 300 is a local positioning system (LPS) that includes a range meter 302 and/or a digital camera that is coupled to a pan and tilt unit 304.

Local coordinate measurement system 300 may be used to calibrate articulated robotic system 200 to the coordinate system of structure 104. In the exemplary embodiment, range meter 302 measures relative distances of visible feature 110 of structure 104 to determine the relative position of the local coordinate measurement system 300 to structure 104. Additionally, in the exemplary embodiment, range meter 302 measures relative distances of an exterior features 210 of articulated robotic system 200, such as points on base 212. More specifically, in the exemplary embodiment, local coordinate measurement system 300 facilitates aligning articulated robotic system 200 and/or structure 104 with respect to a coordinate system to enable registering a relative location of positioning sensor 206 and inspection sensor 102.

Pan and tilt unit 304 is actuatable to variably orient range meter 302 of local coordinate measurement system 300. In the exemplary embodiment, pan and tilt unit 304 enables range meter 302 to rotate about a vertical axis of rotation 306 and about a horizontal axis of rotation 308. More specifically, in the exemplary embodiment, range meter 302 is rotatable about vertical axis of rotation 306 to pan range meter 302, and range meter 302 is rotatable about horizontal axis of rotation 308 to tilt range meter 302. In one embodiment, the height as well as the lateral position of the range meter 302 is variably adjustable. In another embodiment, pan and tilt unit 304 is configured to measure a horizontal and/or vertical angle between exterior features 110, 210.

Once the articulated robotic system 200 is calibrated to the target object 104, the inspection process begins by inserting the robot's end effector containing the positioning sensor 206 and inspection sensor 102 through access port 112. From the operator workstation 400 the operator 412 directs arm 204 past obstacles 116 inside target object 104 by watching a virtual display of the target object 104, robotic arm 204, positioning sensor 206, and inspection sensor 102 are displayed on a graphical presentation interface 406. Information from the positioning sensor 206 is converted into the coordinate system of target object 104 in order to place the virtual objects in the proper positions and orientations on the graphical presentation interface 206. In addition, internal landmarks or obstacles 116 can be used to adjust or re-calibrate the position data measured by the positioning sensor 206. For example, if the robot arm is in contact with an obstacle 116, which is at a known position, but the positioning sensor 206 is reporting a different position, the data from the positioning sensor can be adjusted to reference this known position of obstacle 116.

Figure 3:
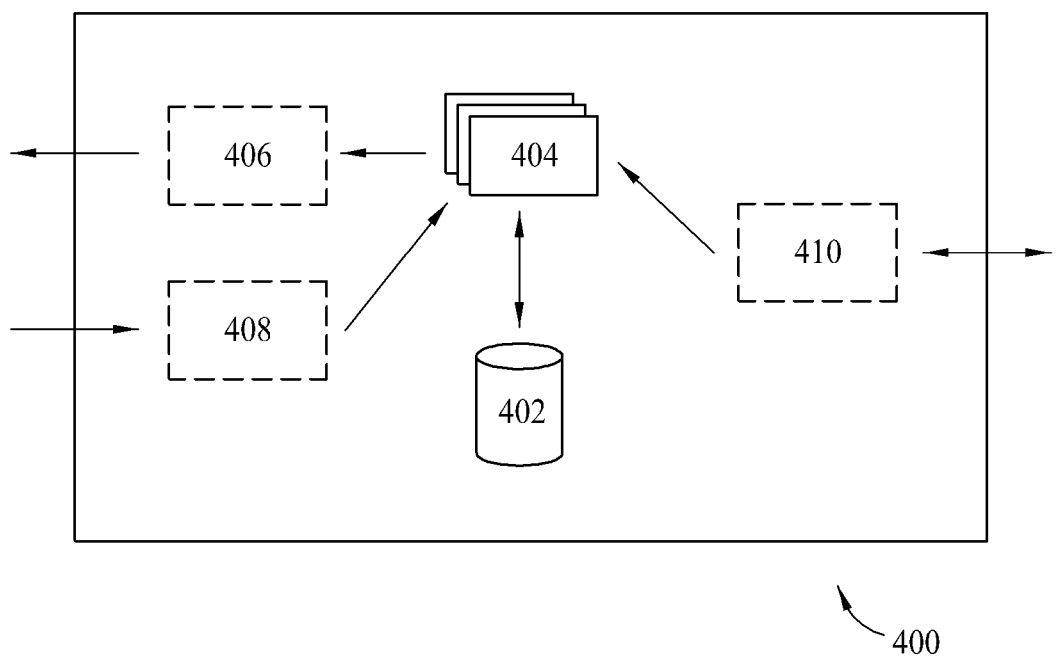
FIG. 3 is an illustration of an exemplary control system that may be used with the system shown in FIG. 1.

FIG. 3 illustrates an exemplary control system 400, also illustrated in FIGS. 1 and 2, that may be used to operate system 100. In the exemplary embodiment, control system 400 includes a memory device 402 and a processor 404 coupled to memory device 402 for executing instructions. In some embodiments, executable instructions and/or model data for structure 104 are stored in memory device 402. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits.

Control system 400 is configurable to perform one or more operations described herein by programming processor 404. For example, processor 404 may be programmed by encoding an operation as one or more executable instructions and by providing the executable instructions in memory device 402. Processor 404 may include one or more processing units (e.g., in a multi-core configuration).

Memory device 402 includes one or more devices that enable information, such as executable instructions and/or other data, to be selectively stored and retrieved. In the exemplary embodiment, such other data includes at least a predetermined three-dimensional computer-aided design (CAD) model that is representative of structure 104. Memory device 402 may include one or more computer readable media, such as, without limitation, dynamic random access memory (DRAM), static random access memory (SRAM), a solid state disk, and/or a hard disk. Moreover, memory device 402 may be configured to store, without limitation, executable instructions and/or any other type of data.

In the exemplary embodiment, control system 400 includes a graphical presentation interface 406 that is coupled to processor 404 to enable information to be presented to a user 412. For example, graphical presentation interface 406 may include a display adapter (not shown) that is coupleable to a display device (not shown), such as a cathode ray tube (CRT), a liquid crystal display (LCD), a light emitting diode (LED)

display, an organic LED (OLED) display, and/or an "electronic ink" display. In the exemplary embodiment, graphical presentation interface 406 enables the user 412 to selectively position and/or visualize the position of inspection sensor 102 using system 100. In some embodiments, graphical presentation interface 406 includes one or more display devices. In addition to, or in the alternative, graphical presentation interface 406 may be coupled to, and/or include, a printer.

In the exemplary embodiment, control system 400 includes an input interface 408 that receives input, such as control commands, from user 412. For example, input interface 408 receives information suitable for use with the methods described herein. Input interface 408 is coupled to processor 404 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both a display device of graphical presentation interface 406 and as an input interface 408.

In the exemplary embodiment, control system 400 includes a communication interface 410 coupled to processor 404. In the exemplary embodiment, communication interface 410 communicates with a remote device, such as inspection sensor 102, articulated robotic system 200, positioning sensor 206, local coordinate measurement system 300, and/or another control system 400. More specifically, in the exemplary embodiment, control system 400 cooperates with graphical presentation interface 406 and/or input interface 408, to enable user 412 to operate system 100. For example, communication interface 410 may include, without limitation, a wired network adapter, a wireless network adapter, and/or a mobile telecommunications adapter. Alternatively or additionally, control system 400 may be coupled to articulated robotic system 200, local coordinate measurement system 300, and/or another control system 400 via a network (not shown). Such a network may include, without limitation, the Internet, a local area network (LAN), a wide area network (WAN), a wireless LAN (WLAN), a mesh network, and/or a virtual private network (VPN) or other suitable communication means. In the exemplary embodiment, control system 400 is electrically coupled directly to, and/or formed integrally with, articulated robotic system 200 and/or local coordinate measurement system 300.

Figure 4:
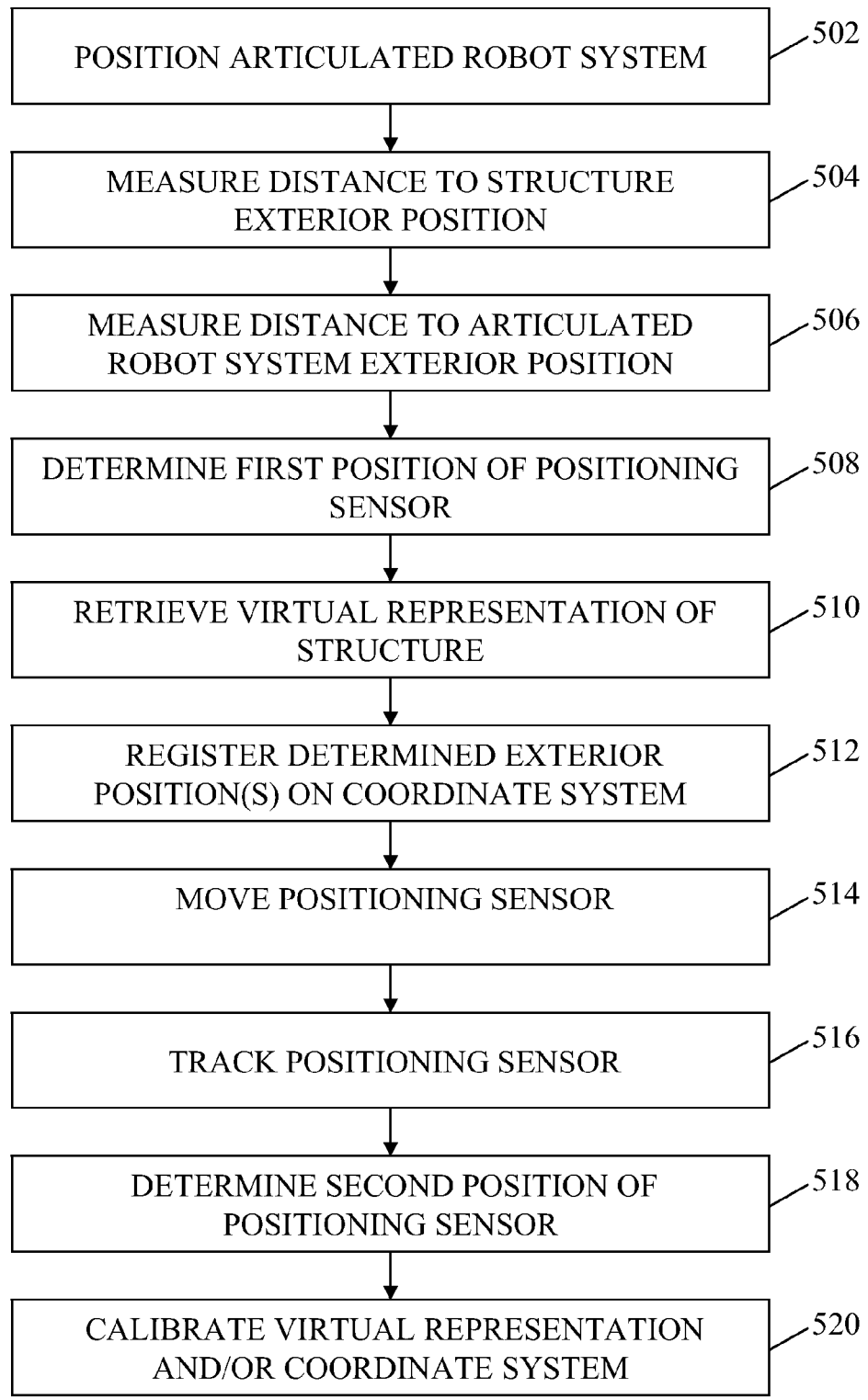
FIG. 4 is a flow chart illustrating an exemplary method of positioning a sensor that may be used with the system shown in FIG. 1.

FIG. 4 illustrates an exemplary method 500 for use in selectively positioning inspection sensor 102 relative to a target object, or structure 104, being inspected. During use, control system 400 facilitates remotely positioning inspection sensor 102 to enable inspection and/or evaluation of structure 104. More specifically, the embodiments described herein enable a position of sensor 206, and as a result the position of the inspection sensor 102, to be accurately tracked using a three-dimensional CAD model of structure 104 in a three-dimensional coordinate system.

Initially, articulated robotic system 200 is positioned 502 proximate and/or adjacent to a target object or structure 104. In the exemplary embodiment, range meter 302 measures 504 a distance to an exterior position of structure 104, and measures 506 a distance to an exterior position of articulated robotic system 200. In the exemplary embodiment, such positional data is transmitted to control system 400 to enable control system 400 to accurately determine a position and/or an orientation of structure 104 and/or articulated robotic system 200 relative to local coordinate measurement system 300. In one embodiment, triangulation techniques are used to determine the relative positions of structure 104 and articulated robotic system 200. Based at least on such positional data, in the exemplary embodiment, control system 400 determines 508 a first position of positioning sensor 206, which is coupled to articulated robotic system 200.

In the exemplary embodiment, at least one virtual representation of structure 104 is received 510 from memory device 402. In one embodiment, a type of structure 104 may be identified and/or determined based on positional data of structure 104, and a virtual representation of structure 104 may be determined and/or selected based on the type of structure 104. Moreover, in the exemplary embodiment, a virtual representation of articulated robotic system 200 and/or positioning sensor 206 may be provided based on the first position of positioning sensor 206. The virtual representations of structure 104, robotic system 200 and/or positioning sensor 206 are then registered 512 on a three-dimensional coordinate system.

In the exemplary embodiment, articulated robotic system 200 actuates arm 204 to suitably position, orient, and/or move 514 inspection sensor 102 relative to structure 104 for inspection and/or evaluation of structure 104. In one embodiment, user 412 may use graphical presentation interface 406 and/or input interface 408 to navigate arm 204 through an access port 112 and/or around other internal landmarks and/or obstructions 116. In such an embodiment, user 412 directs arm 204 past obstructions 116 inside structure 104 by watching a virtual display of structure 104, robotic arm 204, position sensor 206, and inspection sensor 102 on graphical presentation interface 406. Information from positioning sensor 206 is converted into the three-dimensional coordinate system in order to place the virtual objects in the proper positions and orientations on the graphical presentation interface 206. In another embodiment, data provided by inspection sensor 102 and/or positioning sensor 206 may be used to enable partial and/or full automation of the navigation process to suitably position, orient, and/or move 514 inspection sensor 102 and/or positioning sensor 206.

In the exemplary embodiment, positional awareness data acquired and/or provided by positioning sensor 206 is continuously monitored and/or tracked 516 to provide real-time and post-processed position and/or orientation tracking as positioning sensor 206 is moved 514 from a first location to a second location relative to structure 104. More specifically, in the exemplary embodiment, movement of positioning sensor 206 is tracked 516 with respect to the position of structure 104, the first position of positioning sensor 206, and/or other data provided by positioning sensor 206 and/or inspection sensor 102. As such, in the exemplary embodiment, the second location of positioning sensor 206 may be determined 518 based at least on the first position of positioning sensor 206 and the movement tracked from the first position to the second position. In the exemplary embodiment, the position and/or orientation of positioning sensor 206 is continuously displayed on graphical presentation interface 406 in the three-dimensional coordinate system to virtually track movement of positioning sensor 206 through limited access areas of structure 104.

At any time, data provided by inspection sensor 102 and/or positioning sensor 206 may be used to calibrate 520 the virtual representation of structure 104, articulated robotic system 200, and/or positioning sensor 206 on the three-dimensional coordinate system based at least on the position of structure 104 and/or the first and second positions of positioning sensor 206. In the exemplary embodiment, local coordinate measurement system 300 facilitates calibrating structure 104 and/or articulated robot system 200 to the three-dimensional coordinate system. More specifically, in the exemplary embodiment, relative distances and/or angles between local coordinate measurement system 300, exterior feature 110, and exterior feature 210 are determined.

Once the relative distance between exterior features 110 and 210, i.e., the relative position and orientation between structure 104 and articulated robot system 200, is determined, any motion of arm 204 and positioning sensor 206 may then be converted into the three-dimensional coordinate system. In addition, obstructions 116 may be used to adjust and/or recalibrate the positional data measured by positioning sensor 206. For example, if robot arm 204 is in contact with obstructions 116, which is at a known position, but the positioning sensor 206 is reporting a different position, the data from position sensor 206 may be adjusted to reference this known position of obstructions 116. Using such reference data, numerical integration, alignment, and filtering techniques, an updated and/or recalibrated estimate position and/or orientation of inspection sensor 102 and/or positioning sensor 206 may be provided during operation. For example, the virtual representation may be recalibrated, as necessary, when positional awareness data provided by inspection sensor 102 and/or positioning sensor 206 is not consistent with the virtual representation.

The embodiments described herein provide for remotely placing and/or visualizing a sensor to inspect various components within limited access areas. As such, the exemplary methods and systems facilitate reducing a time and/or cost associated with aircraft inspections. The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the present invention, including the best mode, and also to enable any person skilled in the art to practice those certain embodiments, including making and using any devices or systems and performing any incorporated methods. The patentable scope of the present invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for positioning an inspection sensor within an aircraft, said method comprising:
    determining a position of the aircraft using a first sensor disposed external to the aircraft;
    calibrating a virtual representation of the aircraft with respect to the position of the aircraft;
    determining a first position of the inspection sensor using the first sensor, wherein the inspection sensor and a positioning sensor are coupled to an articulating robotic system at an end effector;
    extending the articulating robotic system through an access port defined in the aircraft and articulating around at least one landmark within the aircraft such that the inspection sensor and the positioning sensor are positioned in an interior of the aircraft without disassembly of the aircraft;
    tracking movement of the inspection sensor within the aircraft and relative to the aircraft using the positioning sensor;
    receiving landmark position information for the at least one landmark within the aircraft;
    determining a current position of the inspection sensor when the inspection sensor contacts the at least one landmark;
    identifying a position conflict when the determined current position is different than the received landmark position information;
    adjusting the determined current position of the inspection sensor based at least partially on the identified position conflict; and
    updating a virtual display of the interior of the aircraft based at least partially on the identified position conflict.

2. The method in accordance with claim 1, wherein calibrating a virtual representation of the aircraft further comprises retrieving the virtual representation of the aircraft.

3. The method in accordance with claim 1 further comprising:
    providing a virtual representation of the inspection sensor based on the first position of the inspection sensor.

4. The method in accordance with claim 3 further comprising:
    determining a second position of the inspection sensor relative to the first position of the inspection sensor using the positioning sensor; and
    calibrating the virtual representation of the inspection sensor with respect to at least the first position and the second position of the inspection sensor.

5. The method in accordance with claim 4, wherein tracking movement of the inspection sensor is based on at least the first position and the second position of the inspection sensor.

6. The method in accordance with claim 1 further comprising:
    providing a virtual representation of the articulated robotic system based on the first position of the inspection sensor.

7. A control system for positioning an inspection sensor within an aircraft, said control system configured to:
    determine a position of the aircraft using a first sensor disposed external to the aircraft;
    calibrate a virtual representation of the aircraft with respect to the position of the aircraft;
    determine a first position of the inspection sensor using the first sensor, wherein the inspection sensor and a positioning sensor are coupled to an articulating robotic system at an end effector;
    extend the articulating robotic system through an access port defined in the aircraft and articulate around at least one landmark within the aircraft such that the inspection sensor and the positioning sensor are positioned in an interior of the aircraft without disassembly of the aircraft;
    track movement of the inspection sensor within the aircraft and relative to the aircraft using the positioning sensor;
    receive landmark position information for the at least one landmark within the aircraft;
    determine a current position of the inspection sensor when the inspection sensor contacts the at least one landmark;
    identify a position conflict when the determined current position is different than the received landmark position information;
    adjust the determined current position of the inspection sensor based at least partially on the identified position conflict; and
    update a virtual display of the interior of the target object based at least partially on the identified position conflict.

8. The control system in accordance with claim 7, wherein said control system is further configured to retrieve the virtual representation of the aircraft.

9. The control system in accordance with claim 7, wherein said control system is further configured to provide a virtual representation of the inspection sensor based on the first position of the inspection sensor.

10. The control system in accordance with claim 9, wherein said control system is further configured to:
   determine a second position of the inspection sensor relative to the first position of the inspection sensor using the positioning sensor; and
   calibrate the virtual representation of the inspection sensor with respect to at least the first position and the second position of the inspection sensor.

11. The control system in accordance with claim 10, wherein said control system is further configured to track movement of the inspection sensor based on at least the first position and the second position of the inspection sensor.

12. The control system in accordance with claim 7, wherein said control system is further configured to provide a virtual representation of the articulating robotic system based on the first position of the inspection sensor.

13. The control system in accordance with claim 12, wherein said control system is further configured to move the articulating robotic system.

14. A system for positioning an inspection sensor within an aircraft, said system comprising:
   an articulated robotic system having an end effector coupled to the inspection sensor and a positioning sensor, and extendable through an access port defined in the aircraft such that the inspection sensor and the positioning sensor are positioned in an interior of the aircraft without disassembly of the aircraft;
   a positioning system disposed external to the aircraft and configured to determine a position of the aircraft and to determine a first position of the inspection sensor; and
   a control system that calibrates a virtual representation of the aircraft with respect to the position of the, tracks movement of the sensor within the aircraft and relative to the aircraft using the positioning sensor, receives landmark position information of at least one landmark within the aircraft, determines a current position of the inspection sensor when the inspection sensor contacts the at least one landmark, identifies a position conflict when the determined current position is different than the received landmark position information, adjusts the determined current position of the inspection sensor based at least partially on the identified position conflict, and updates a virtual display of the interior of the aircraft based at least partially on the identified position conflict.

15. The system in accordance with claim 14, wherein the positioning sensor comprises an inertial sensor.

16. The system in accordance with claim 14, wherein said control system retrieves the virtual representation of the aircraft.

17. The system in accordance with claim 14, wherein said control system provides a virtual representation of the inspection sensor based on the first position of the inspection sensor.

18. The system in accordance with claim 17, wherein said control system determines a second position of the inspection sensor relative to the first position of the inspection sensor and calibrates the virtual representation of the inspection sensor with respect to at least the first position and the second position of the inspection sensor.

19. The system in accordance with claim 18, wherein said control system tracks movement of the inspection sensor based on at least the first position and the second position of the inspection sensor.

20. The system in accordance with claim 14, wherein said control system provides a virtual representation of said articulated robotic system based on the first position of the inspection sensor, and moves said articulated robotic system.

* * * * *